No. 783,948. PATENTED FEB. 28, 1905.
F. G. HANEY.
MEANS FOR SUPPORTING CHINAWARE IN GLAZING KILNS.
APPLICATION FILED MAR. 9, 1904.
2 SHEETS—SHEET 1.
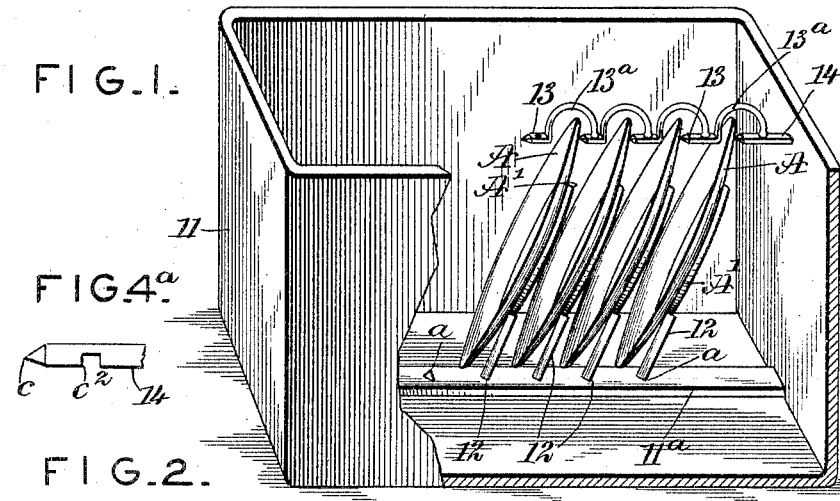
FIG.1.
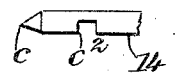
FIG.4.ᵃ
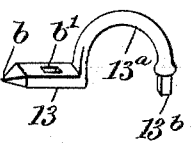
FIG.3.
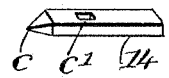
FIG.4.
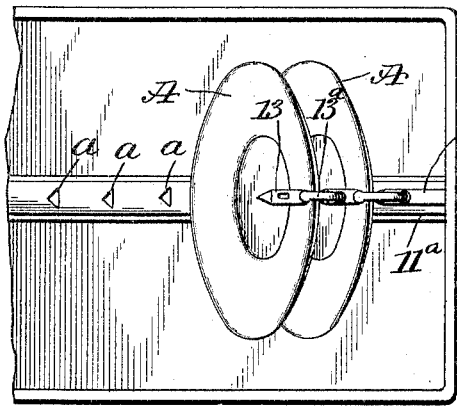
FIG.2.
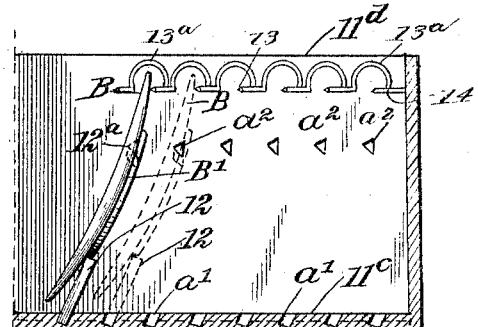
FIG.6.
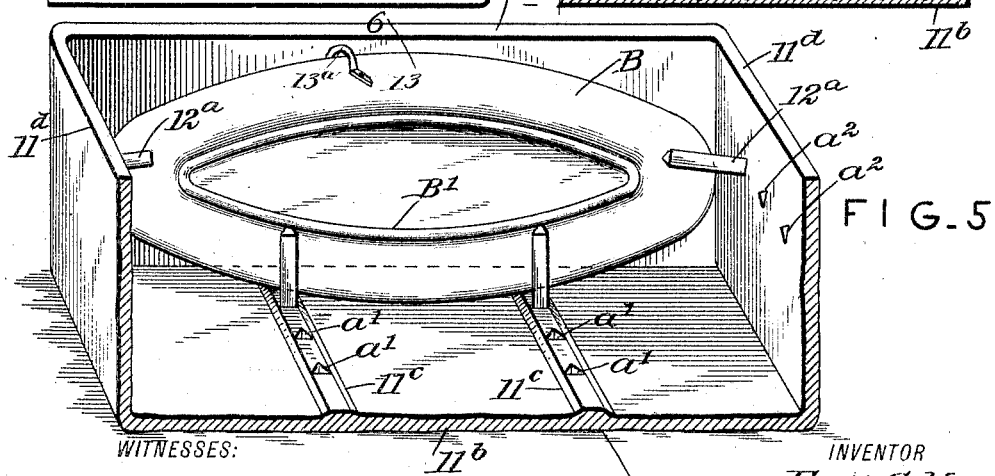
FIG.5.
WITNESSES:
Harry L. Ames
Wm. P. Patton
INVENTOR
Fred G. Haney
BY
Munn
ATTORNEYS No. 783,948. PATENTED FEB. 28 1905.
F. G. HANEY.
MEANS FOR SUPPORTING CHINAWARE IN GLAZING KILNS.
APPLICATION FILED MAR. 9, 1904.
2 SHEETS—SHEET 2.
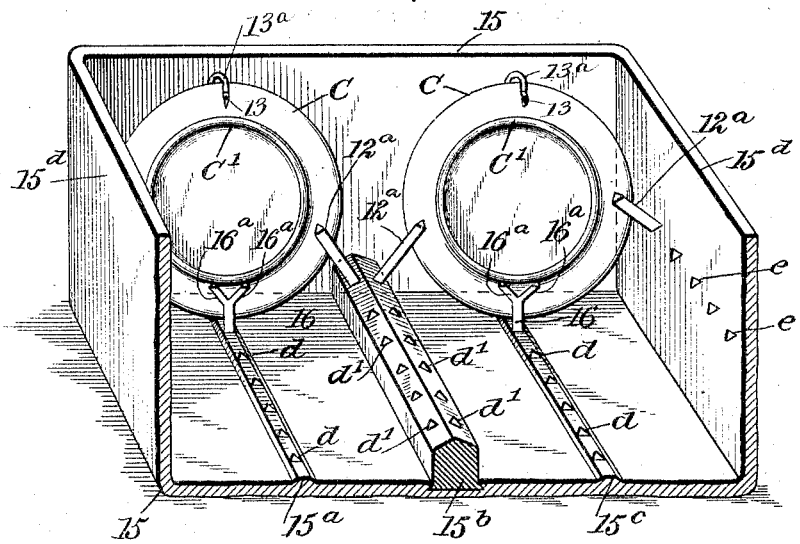
FIG.8. 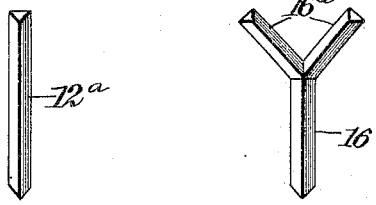 FIG.9. 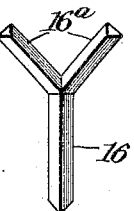
WITNESSES:
Harry L. Amer.
Wm P. Patton
INVENTOR
Fred G. Haney
BY
ATTORNEYS No. 783,948.                                                    Patented February 28, 1905.

UNITED STATES PATENT OFFICE.

FRED G. HANEY, OF EAST LIVERPOOL, OHIO.

MEANS FOR SUPPORTING CHINAWARE IN GLAZING-KILNS.

SPECIFICATION forming part of Letters Patent No. 783,948, dated February 28, 1905.

Application filed March 9, 1904. Serial No. 197,271.

*To all whom it may concern:*

Be it known that I, FRED G. HANEY, a citizen of the United States, and a resident of East Liverpool, in the county of Columbiana and State of Ohio, have invented a new and Improved Means for Supporting Chinaware in Glazing-Kilns, of which the following is a full, clear, and exact description.

In the manufacture of china or porcelain ware—such as dishes, plates, saucers, and the like—the ware after it is formed and burned must be glazed to give it a vitreous polished surface, the glaze being fused on the ware in a suitable kiln. For convenience in handling quantities of dishes or like ware and their support the pieces of ware are arranged in box-like receptacles, technically known as "saggers," which are of a size that permits them to be readily handled.

To prevent the formation of unsightly blemishes on the ware, it is necessary to so support the same in the saggers that the fused glaze will practically cover the entire surface of each piece, as in case the surface of contact between the ware and the support therefor is of any considerable extent the glaze will be prevented from covering such places and the ware will be blemished. Small particles of dirt are liable to fall into the saggers while the ware is undergoing the glazing operation, and to avoid the lodgment of such minute fragments of foreign matter on the surfaces of the ware it is of advantage to support the ware edgewise and nearly upright in the saggers.

The object of my invention is to provide novel simple means for reliably supporting dishes and the like in saggers, so that the dishes will be maintained nearly upright and the points of contact between the ware and the supports reduced so as to have scarcely any area, and also that these points of contact with the ware be located where any slight defect will not mar the general surface of the glazed ware.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a broken perspective view of a sagger and of one improved means for supporting dishes in the sagger. Fig. 2 is a plan view of the sagger, the dishes, and the improved supports for the dishes shown in Fig. 1. Fig. 3 is a detached perspective view of one construction of the improved ware-supports employed to sustain the upper portions of dishes or the like that are disposed nearly upright in a sagger. Fig. 4 is a perspective view of a ware-support employed with the support shown in Fig. 3 and which coacts therewith for retaining the upper portions of dishes or the like in a slightly-inclined position within a sagger. Fig. $4^a$ is a fragmentary detail showing a modification of the support shown in Fig. 4. Fig. 5 is a partial side view of a sagger, a platter disposed edgewise and nearly upright in the sagger, and supporting means for maintaining the platter slightly above the bottom of the sagger and slightly inclined therein. Fig. 6 is a transverse sectional view substantially on the line 6 6 in Fig. 5. Fig. 7 is a partial side view of a sagger, showing details of the improvement mounted on the bottom of the sagger and other improved details arranged for support of dishes above the bottom of the sagger and having clearance from its sides. Fig. 8 is a perspective view of a straight prop-bar employed, which is a detail of the invention. Fig. 9 is a perspective view of another construction of prop-bars which coact with the bars shown in Fig. 8 for the support of plates or the like in a sagger, above the bottom thereof.

The sagger 11 (shown in Figs. 1 and 2 and represented as substantially rectangular,) may be of any preferred dimensions that will adapt it for convenient portage and of course is formed of refractory material well adapted to withstand the action of heat. A ledge $11^a$ is formed or secured across the bottom of the sagger 11, and in the ledge a series of spaced sockets *a* is formed, that penetrate it from the upper side, the series of sockets extending nearly from one side wall of the sagger to the opposite one. A plurality of straight prop-bars 12, triangular in cross-section, each have one end loosely fitted into a corresponding socket $a$, and the prop-bars may incline slightly in the same direction, as shown in Fig. 1.

Nearly all flat ware—such as plates, large and small—have a projecting rib or base-ring formed on their bottoms, these projecting ribs being technically known as "feet," whereon the dish is supported when seated upon a table or the like. The formation of a foot $A'$ on a dish A affords an offset or shoulder on the lower side of said dish, plate, or the like, and when the dish is placed in a sagger an angular corner on the upper end of an adjacent prop-bar 12 is seated in the corner formed at the junction of the shoulder or foot $A'$ with the lower side of the dish. In a side wall of the sagger toward which the dish is to be slightly inclined a perforation is formed in the same vertical plane with that of the sockets $a$ in the ledge $11^a$.

One improved means for supporting the upper portions of a plurality of dishes, such as A in Figs. 1 and 2, is shown in Figs. 3 and 4. The device represented in Fig. 3 is in the form of a preferably straight arm 13, pointed at one end, $b$, and formed of refractory and heat-hardened material, having an arched extension $13^a$ formed on the other end, that curves sufficiently to project the free end thereof downward at a proper distance from the straight arm, and on said free end of the extension $13^a$ a tenon $13^b$ is formed. A straight bar 14 (shown clearly in Fig. 4) is provided as an essential completing part of the support, of which the detail just described is a portion. The bar 14 is formed of like material to that of the parts 13 $13^a$, and one end, $c$, is pointed, as shown, the opposite end being blunt and in use is seated in a perforation in the wall of the sagger. In the body of the bar 14 near the pointed end $c$ a vertical perforation $c'$ is formed of a size that adapts the perforation for the reception of the tenon $13^b$, and in the straight arm 13, near the pointed end $b$ thereof, a perforation $b'$ is formed, wherein a like tenon $13^b$, on the curved member $13^a$ of another supporting device, is inserted and held by the weight of the arm 13 and its curved extension. If preferred, the perforations $b'$ and $c'$ may be open at one side, as indicated at $c^2$ in Fig. $4^a$, and be equally as effective.

In applying the described means for supporting a plurality of dishes A nearly upright in a sagger 11, as shown in Figs. 1 and 2, a prop-bar 12 is inserted in a socket $a$ near the perforated side of the sagger. A bar 14 is now engaged with said perforated side wall of the sagger by inserting its blunt end into the perforation therein, this engagement adapting the straight bar 14 to project horizontally in the sagger above the ledge $11^a$. One of the arched members $13^a$ on a straight bar 13 is now connected with the horizontally-disposed bar 14 by the insertion of the tenon $13^b$ thereon through the perforation $c'$ in said bar 14. The position given to the straight bar 14 adapts the pointed end $c$ thereon to contact with the bottom of a dish A, engaged with the upper pointed end of the prop-bar 12 at the shoulder $A'$ of the dish, as before explained, and as the length of the bar 14 is proportioned to permit it the dish A will be held slightly inclined toward the side of the sagger from which the bar 14 is projected.

It will be seen that the engagement of the tenon $13^b$ on the curved member $13^a$ adapts said arched member $13^a$ to have clearance from the upper edge portion of the dish A and the straight member 13 to project for an engagement of its pointed end $b$ with the bottom surface of another dish A, engaged at its shoulder $A'$ with the angular corner of the upper end of another prop-bar 12. It will be seen that the tenon $13^b$ on another arched member $13^a$ may be inserted into a perforation $b'$ in the straight member 13, engaged at its pointed end with the second dish A, and by the employment of another prop-bar 12 a third dish may be supported in an inclined position within the sagger.

Obviously the arrangement of the improved supports for chinaware in a sagger may be multiplied to support any desired number of dishes in said sagger. As there is practically no area covered on the dishes by the pointed ends of the arms and prop-bars that engage therewith and as the prop-bars support the dishes above the ledge $11^a$, the glazing of the dishes will be perfect and devoid of blemishes that occur when ordinary means for supporting such ware in saggers is employed.

In Fig. 5 a sagger $11^b$ is shown of proper dimensions to receive and properly support a plurality of large dishes, such as platters B, these usually having an oval contour. To enable the proper disposal of such ware in the sagger, the latter is furnished with two ledges $11^c$, that are formed on the bottom wall and spaced from the end walls $11^d$ of the sagger, said ledges being parallel with each other. In each ledge $11^c$ a series of sockets $a'$ is formed, that are spaced apart equally, and, as shown, said sockets are triangular. Oppositely in the end walls $11^d$ like series of sockets or perforations $a^2$ are formed in each wall, having proper spacing with regard to that of the sockets $a'$. In placing a platter B in the sagger $11^b$ two triangular-bodied prop-bars 12 are employed, that are inserted in sockets $a'$, which are equally distant from a side wall $11^e$ of the sagger and have like angular corners at their upper ends engaged in the corner formed by the junction of the oval foot $B'$ on the platter B with its bottom. Two straight triangular-bodied arms $12^a$, similar to the props 12, are inserted in two opposite sockets or perforations $a^2$ from the inner sides of the end walls 11$^d$, so that said arms project into the sagger and are adapted to have contact at like angular corners with the normal lower surface of the dish B, that is mounted on the prop-bars 12 near the ends of said platters. The height of the prop-bars 12 is equal, and, as shown, the relative position of the arms 12$^a$ is such as to permit the platter to lean somewhat from a vertical position, this appearing in Figs. 5 and 6, which will serve to support the platter above the ledges 11$^c$ and free of contact with any part of the sagger. It is also of advantage to space apart the upper edges of a number of platters or like dishes B by means of the coacting supporting members 13 13$^a$ 14, as shown for one platter in Fig. 5. It will be evident that a plurality of platters B may be placed in the sagger 11$^b$ and be supported by the means employed for one platter, and thus be adapted to receive glazing without liability of having any portion of their surfaces defaced by dirt or contact with their supports.

In the sagger 15 (shown in Fig. 7) three ledges 15$^a$ 15$^b$ 15$^c$ are formed on its bottom wall, these ledges being equally spaced apart from each other and the ledges 15$^a$ 15$^c$ disposed at a suitable distance from the respective end walls 15$^d$ of the sagger. An equal series of equally-spaced triangular sockets $d$ is formed in each of the ledges 15$^a$ 15$^c$, and in each end wall 15$^d$ a like series of sockets or perforations $e$ is formed, as shown for one end wall in Fig. 7. The ledge 15$^b$ is located centrally between the ledges 15$^a$ 15$^c$ and is somewhat higher than said ledges and is also of greater width and on the upper side is sloped from a central point toward each side of the same. In the two slightly and oppositely inclined surfaces thus produced on the upper side of the central ledge 15$^b$ a row of spaced sockets $d'$ is formed equal to the series of socket $d$ formed in the ledges 15$^a$ 15$^c$.

In Fig. 9 a prop-bar is shown that may be advantageously employed with the prop-bar 12 for the support of plates or other nearly flat china dishes in a sagger. The prop-bar represented detached in Fig. 9 and as applied in Fig. 7 consists of a straight leg member 16, having two laterally-inclined arm members 16$^a$ formed on the upper end thereof, thus giving the complete prop-bar Y shape, and to adapt said bar for effective service it is formed of refractory material hardened by heat, the upright leg and arms thereof having triangular form in cross-section.

In arranging the supports for dishes in the sagger shown in Fig. 7 a Y-shaped prop-bar is erected on each ledge 15$^a$ 15$^c$ by the insertion of the lower end of the leg 16 of each prop-bar in a socket $d$, these engaged sockets being equally spaced from the side wall 15$^d$ of the sagger 15. A plate C is now placed edgewise and nearly erect in the sagger 15, with the normal lower surface near the like angular corners at the upper ends of the prop-arms 16$^a$, so that said corners may be introduced in the corner between the foot C' on the plate and the lower surface of the latter. The plate is held nearly upright on the arms 16$^a$ above the ledge 15$^c$ by the insertion of a prop-bar 12$^a$ or arm of a similar shape thereto in an appropriate socket or perforation $e$ in an end wall 15$^d$ of the sagger 15, the said arm projecting angularly toward the normal lower side of the plate C, so as to have an angular corner thereon impinge upon said lower surface. From an appropriate socket $d'$ in an inclined surface on the central ledge 15$^b$ a straight arm or prop-bar 12$^a$ is extended diagonally toward the lower surface of the plate C and contacts therewith at a point nearly opposite the point impinged upon by the other straight arm 12$^a$, and as the straight arms are slightly rearward of the foot C' on the plate C it will be seen that the plate will be reliably supported by the Y-shaped prop-bar 16 and the arms 12$^a$, and as these supports have but slight area of contact with the plate at points which are not greatly exposed it will be evident that the glazing of the plate will not be marred by the said supports that do not prevent the free flow of the glaze over all parts of the plate. A plurality of plates C or others of different form may be placed in the sagger 15 and arranged for independent support on the supports described.

In some cases it may be preferred to employ the supporting members 13, 13$^a$, and 14 to hold the upper edges of saucers and small plates spaced apart, as indicated in Fig. 7 for one plate. The arrangement of these coacting members, being best shown in Figs. 1, 3, and 6, is the same as described for ware held in sagger 11.

Having thus described my invention, I claim as new and desire to secure by Letters Patent—

1. The combination with a sagger, of a prop erected from the bottom of the sagger, and having a pointed upper end for engagement with the foot of a piece of ware, and means for supporting said piece of ware in the sagger.

2. The combination with a sagger having a socket in its bottom wall, of a prop engaged by one end in the socket so as to project upward therefrom, and having a pointed upper end, said end being adapted to receive the foot of a piece of ware, and means for supporting said piece of ware nearly upright in the sagger.

3. The combination with a sagger having a row of spaced sockets in its bottom wall, of a plurality of props having their lower ends respectively bedded in the sockets and having pointed upper ends that individually engage the foot on a respective piece of ware, and means for supporting the pieces of ware similarly inclined and spaced from the sagger and from each other.

4. The combination with a four-walled sagger, having spaced sockets in opposite side walls thereof, and rows of spaced sockets in the bottom of the sagger, of props having pointed upper ends and respectively bedded in a socket in a respective row of sockets, said pointed ends being adapted for engagement with the foot on a dish, and arms bedded in opposite sockets in the sides of the sagger, said arms having pointed ends for contact with the bottom surface of the dish near its edge, so as to support said dish nearly upright in the sagger.

5. The combination with a sagger having four spaced rows of sockets formed in ledges on its bottom wall, and similar series of sockets in opposite upright walls of the sagger, of Y-shaped props respectively bedded at their lower ends in respective sockets in the outer rows of said sockets, so that the forked arms of the props may engage the pointed ends thereof with the feet on dishes, and prop-arms having pointed ends, said prop-arms having their other ends bedded in opposite sockets in the inner rows of sockets and in rows of sockets in the sides of the sagger, so as to extend therefrom and contact with their pointed ends on the lower surfaces of pieces of ware resting on the pointed ends of the arms on the Y-shaped props.

6. In a device of the character described, a sagger having triangular sockets in its sides and bottom.

7. In a device of the character described, a sagger having ledges on its bottom, said ledges having spaced sockets therein for the reception of posts that carry dishes above the ledges.

8. In a device of the character described, a straight prop-bar having a pointed end for engagement with the foot on a piece of ware to be glazed.

9. In a device of the character described, a Y-shaped prop having pointed ends on its divergent upper members.

10. A support for dishes in a sagger, comprising a straight bar having a pointed end and a vertical opening therein near said pointed end, and a straight bar pointed at one end, vertically perforated near said end and provided with an arched extension terminating at its free end in a depending tenon adapted to engage the vertical opening in the first-described straight bar.

In testimony whereof I have signed my name to this specification in the presence of two subscribing witnesses.

FRED G. HANEY.

Witnesses:
J. N. ROSE,
CHAS. PEPIN.